United States Patent [19]

Heaton

[11] 3,918,175

[45] Nov. 11, 1975

[54] DRIVER TRAINING SIGNALING DEVICE

[76] Inventor: Joe Heaton, 120 W. Washington St., Tipton, Ind. 46072

[22] Filed: Oct. 3, 1974

[21] Appl. No.: 511,818

[52] U.S. Cl. .................................................. 35/11
[51] Int. Cl.² ......................................... G09B 9/04
[58] Field of Search............ 35/11 R, 25; 116/28 R, 116/63 P, 63 PC; 340/51, 61; 9/9

[56] References Cited
UNITED STATES PATENTS

| | | | |
|---|---|---|---|
| 2,625,130 | 1/1953 | Morser | 116/63 P |
| 2,798,451 | 7/1957 | Hund | 116/63 P |
| 2,825,803 | 3/1958 | Newbrough | 9/9 X |
| 2,879,350 | 3/1959 | Howell | 340/51 X |
| 3,180,950 | 4/1965 | Jacobsen | 340/61 X |
| 3,815,260 | 6/1974 | Heaton | 35/11 |
| 3,859,738 | 7/1975 | Heaton | 35/11 |

*Primary Examiner*—Wm. H. Grieb
*Attorney, Agent, or Firm*—David H. Semmes

[57] ABSTRACT

Automotive vehicle parking and driving instruction devices, particularly a portable barrel element including a portable base, a resiliently suspended hood and a signal transmitter actuable, as said hood is laterally disposed by the student vehicle.

11 Claims, 5 Drawing Figures

DRIVER TRAINING SIGNALING DEVICE

BACKGROUND OF THE INVENTION

1. Field of the Invention

Vehicle, including automobile and truck, driver training and evaluation. Particularly, instruction in turning and backup with respect to simulated road obstacle, parking and loading situations.

A great deal of recent attention has been given to driver training instruction at the high school or pre-licensing level. The training routinely consists of both classroom and highway instruction, the latter sometimes including parking training. Parking training, for the most part, has been devoted to attempted parking between empty crude oil barrels randomly placed in the high school parking lot. The technique suffers both from fender damage inflicted when the student driver touches the barrel and from the difficulty in the instructor's scoring. Effective scoring has been accomplished only by an individual instructor or attendant at each simulated barrel.

SUMMARY OF THE INVENTION

According to the present invention, the driver training barrel includes a base having a vertically extending support member. A cylindrical hood member is resiliently suspended with respect to the support member and superposed with respect to the base. A signal transmitter is supported in the base and includes switch elements with the hood, such that lateral movement of the hood as by a student vehicle activates the transmitter for signaling driver error. The base member may be a conventional pneumatic tire and hub assembly.

DESCRIPTION OF THE PREFERRED EMBODIMENTS

Figure 1:
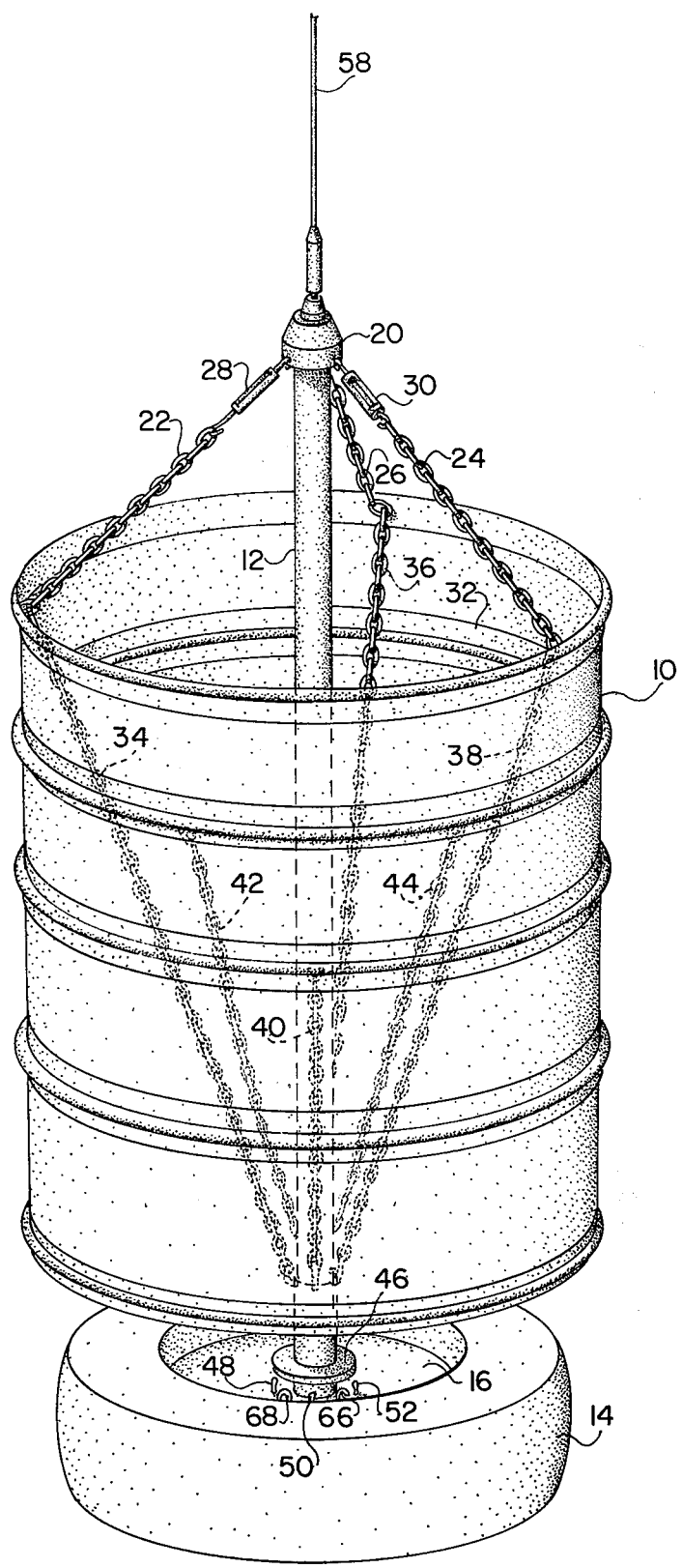
FIG. 1 is a perspective view of the proposed flexible hood resiliently suepended with respect to a tire base.

In FIG. 1 hood member 10 is illustrated as resiliently suspended with respect to support member 12, extending vertically from bottom plate 16 supported within rubber tire 14. The hood member includes a plurality of tension wires or hoops which hold the woven "Neoprene" or similar waterproof exterior in a distended cylindrical form. These wires or hoops may be padded or covered with rubber or other shock absorbing material.

Figure 3:
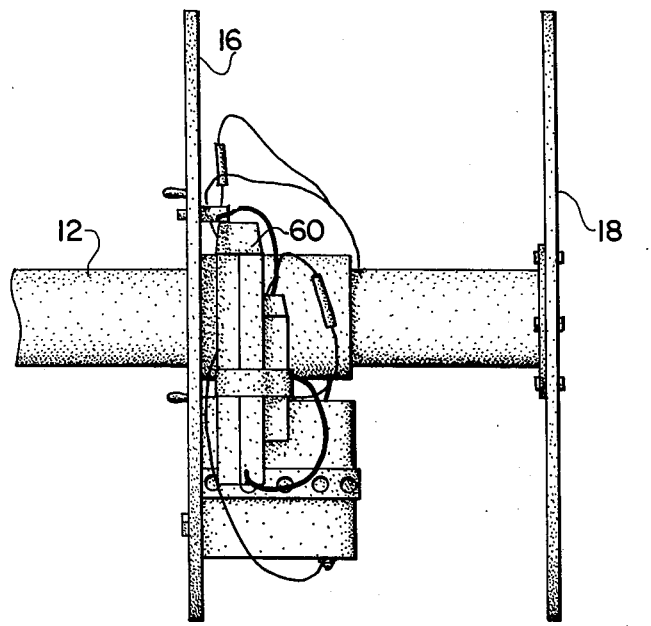
FIG. 3 is an enlarged side elevation of the base element showing the top and bottom plates, supporting the switch elements and signal transmitter.

As illustrated in FIG. 3 bottom plate 16 is superposed with respect to lower plate 18 so as to be fitted within an automobile tire and rim assembly 14.

The hood 10 is suspended by means of an upper collar 20 to which individual suspensory chains 22, 24 and 26 are connected by means of adjusting turnbuckles 28 and 30. One or more additional turnbuckles (not shown) may be employed. Lower individual chains 34, 36, and 38 extend to lower contact plate 46 which encircles the vertical member 12. In addition, there are individual lower chain elements 40, 42 and 44 extending from the lower contact plate 46 to the interior sides of the hood. Bottom plate 16 includes switch elements 48, 50 and 52 which are in normally closed positions, except when contact plate 46 rests upon them. Bottom plate 16 may include permanent magnetic elements 66 and 68, as well as additional magnetic elements (not shown), secured by means of stove bolts 65 and 67, so as to urge and close contact plate 46 against switch elements 48, 50 and 52. This arrangement also assists in stabilizing the hood against the wind and thereby, preventing erroneous opening of the switches.

Figure 2:
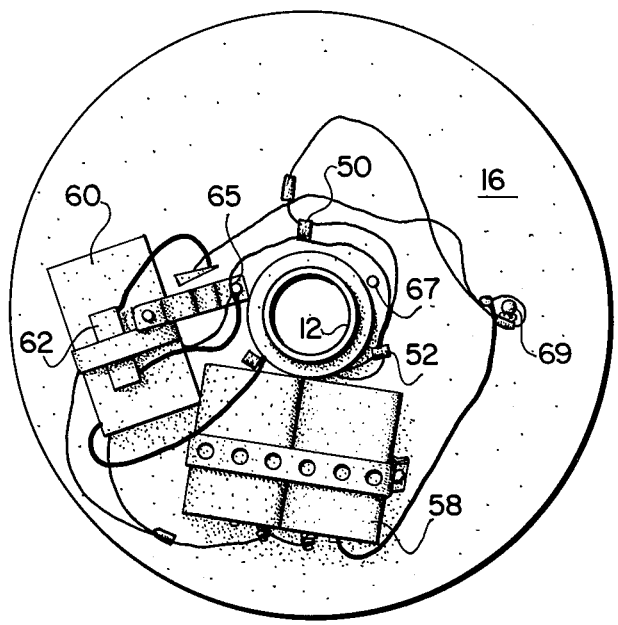
FIG. 2 is a bottom plan of the base including the storage battery and radio transmitter elements.
Figure 4:
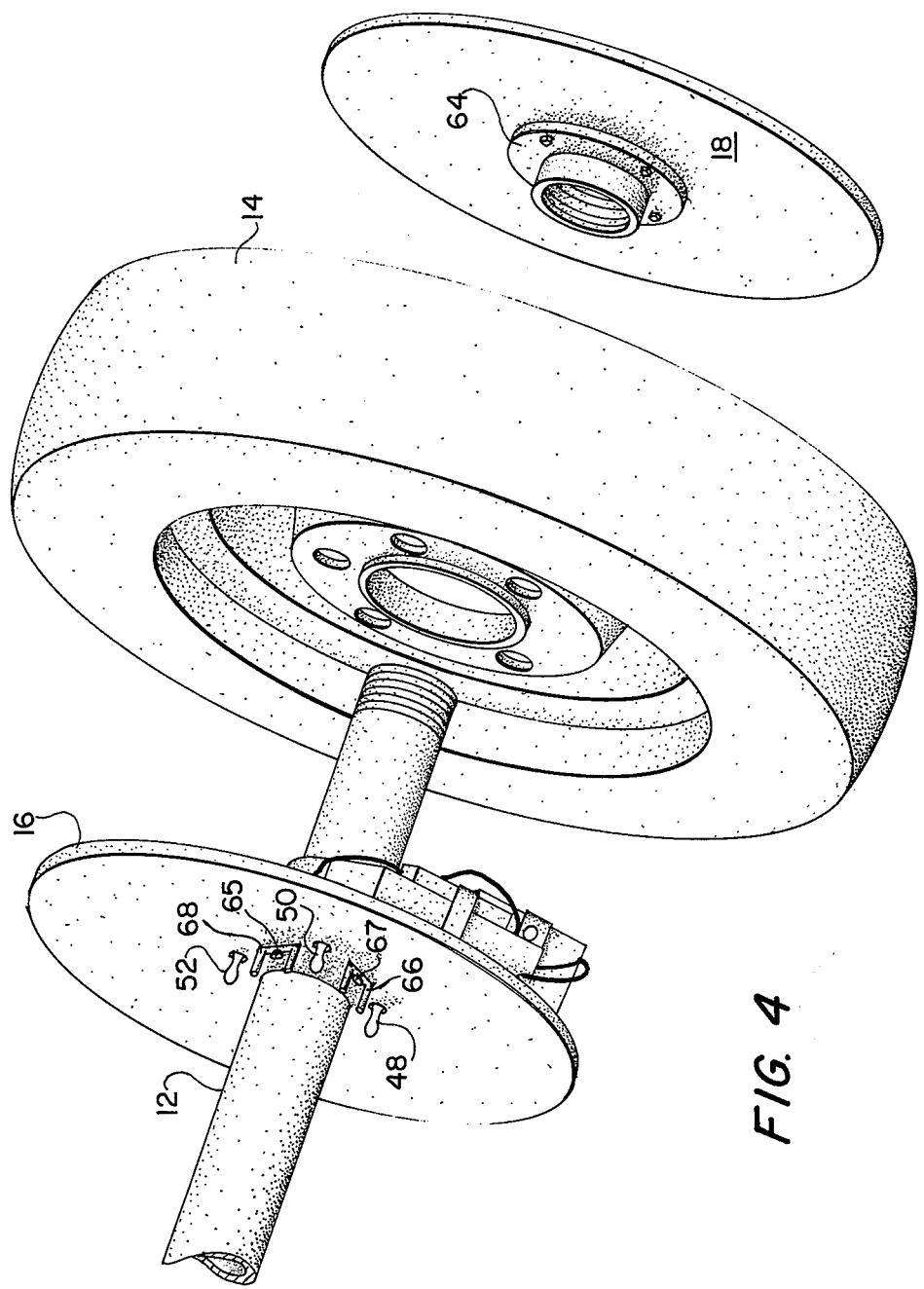
FIG. 4 is an exploded view showing insertion of the base element within the tire and closure by means of the bottom plate.

As indicated in FIGS. 2–4 switches 50, 52 and 48 are closed upon movement and release of contact plate 46, energized by means of storage battery elements 58 which also activate signal transmitter 60 by means of magnetic reed switch 62. Switches 48, 50 and 52 are push type switches and are of a normally closed type and when at rest the lower contact plate 46 pushes each of the switches open and then contacts the magnets 66 and 68 as well as an additional magnet (not shown) which in effect, then, hold the barrel from swinging freely in the wind and at the same time hold the switches open and in readiness for a student contact. The magnets also serve to require a certain positive student contact or pressure prior to releasing the switches which may or may not be a good feature of the barrel.

The magnets 68 and 66 are bolted on to the bottom plate 16 through a hole drilled in the center of the magnet by a stove bolt permitting the two open ends to be in an "up" position such that contact plate 46 comes down and rests on the two open feet of the magnets.

The three switches 48, 50 and 52 are normally closed when there is no weight upon them. Thus, these normally closed switches are in an open position when the weight is on them. Manifestly, the reed switch and other switching elements may be replaced by transistors. Lower plate 18 may have a threaded female cavity 64 engageable with the lower end of vertical element 12, so as to tighten the base element with respect to the automobile wheel.

Figure 5:
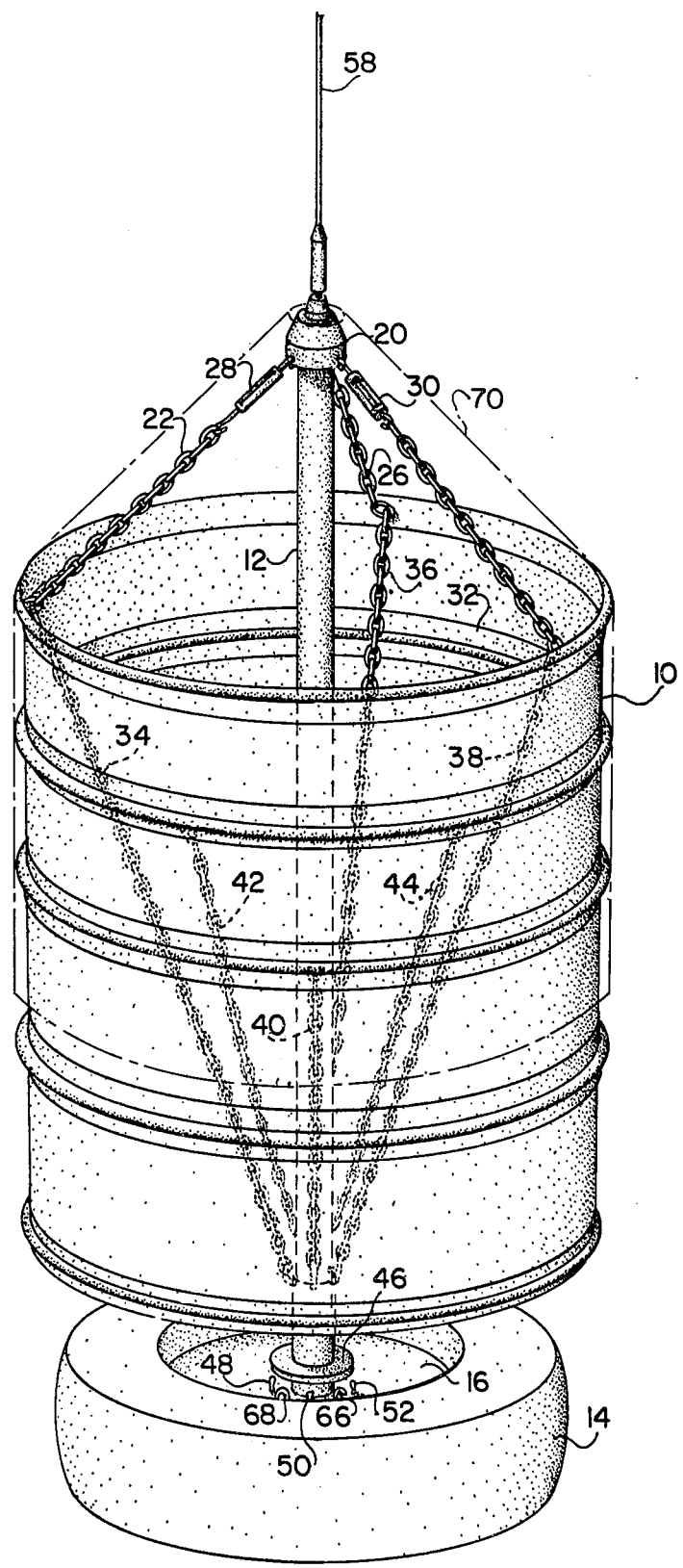

As illustrated in FIG. 1 the hood is suspended approximately 3 inches above the wheel 14 and extends outwardly thereof a similar distance. A waterproof cone 70, illustrated in phantom in FIG. 5, may be suspended from upper collar 20, overlapping hood 10. Cone 70, as well as the hood 10, may be color coded. As the student abuts the hood causing lateral displacement, there is vertical displacement of contact plate 46 with respect to one or more of the switches 48, 50 and 52. Manifestly, an additional or lesser number of switches may be employed. Consequently, the signal transmitter is activated, signaling via antenna 58 to master control and scoring. The chain elements may be of the plastic type. Manifestly, various types of resilient suspensions may be employed. The antenna 58 may include a lower spring or flexible element and may be tapered. Also, vertical support 12 may be formed from extended plastic, such that the entire signal transmitter and antenna assembly could be removably supported in its upper portion. For non-scoring instruction the transmitter could be removed and bells or other audible signal means installed, such that the student could audibly detect driving errors. An "on-off" safety switch 69, illustrated in FIG. 2 may be employed for shutting down the circuit when not in use or in storage.

Also, by taking a pipe cutter and starting a circular cut above the threads above wheel 14 one can start a breaking point and when the center support 12 is over stressed it will break away from the exerted force at the precise predetermined break point. This is a feature of "break away" furniture used in the movies.

As will be apparent, the weight of the automobile wheel and tire largely prevents upsetting of the device which is rugged, virtually weatherproof and independently maintained. Additional weight may be added, of course, for stabilizing purposes. A single instructor could thus supervise an entire training range of 150 or more barrels, each barrel independently transmitting its signals into a digital scoring device.

Manifestly, variations in the chain, transmitter, hood and antenna elements may be employed without departing from the spirit of the invention.

I claim:

1. A driver training signaling device comprising:
   A. a base including a vertically extending support member;
   B. a hood member resiliently suspended with respect to said support member and superposed with respect to said base;
   C. a signal transmitter supported upon said base and including switch elements contactible with said hood, so as to transmit as said hood is moved as by a vehicle with respect to said base and switch elements.

2. A driver training signaling device comprising as in claim 1, including a collar encircling said vertically extending support member with resilient support members extending from said collar to the interior of said hood.

3. A driver training signaling device as in claim 2, wherein said resilient members are chain members.

4. A driver training signaling device as in claim 2, wherein said hood includes a lower contact plate extending from said support members, so as to engage said switch elements.

5. A driver training signaling device as in claim 4, said normally closed switch elements being open except as said lower contact plate is lifted by said resilient members upon lateral movement of said hood.

6. A driver training signal device as in claim 5, said signal transmitter, including a bottom plate supporting said switch elements.

7. A driver training signaling device as in claim 1, said base comprising an automobile tire and rim with said transmitter and switch elements supported inwardly of said tire and protected thereby.

8. A driver training signaling device as in claim 6, including a magnetic element attached to said top plate normally urging said lower contact plate to open position with respect to said normally closed switch elements.

9. A driver training signaling device as in claim 1, said vertically extending member supporting an antenna for said signal transmitter.

10. A driver training signaling device as in claim 1, wherein said vertically extending member includes a break away mechanism, so as to break at predetermined stress.

11. A driver training signaling device as in claim 1, said signal transmitter including an "on-off" switch for activating and deactivating said transmitter.

* * * * *